United States Patent
Lee et al.

(10) Patent No.: US 10,277,143 B1
(45) Date of Patent: Apr. 30, 2019

(54) INVERTER SUPPLYING POWER TO INDUCTION MOTOR FOR DRIVING HOIST

(71) Applicant: LSIS CO., LTD., Anyang-si, Gyeonggi-do (KR)

(72) Inventors: Eun-Woo Lee, Anyang-si (KR); Jung-Han Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/958,201

(22) Filed: Apr. 20, 2018

(30) Foreign Application Priority Data

Feb. 1, 2018 (KR) ................ 10-2018-0012683

(51) Int. Cl.
| *H02M 5/40*   | (2006.01) |
| *H02M 7/48*   | (2007.01) |
| *B66C 13/26*  | (2006.01) |
| *H02P 23/08*  | (2006.01) |
| *H02P 27/04*  | (2016.01) |
| *H02P 27/06*  | (2006.01) |
| *H02P 6/08*   | (2016.01) |
| *H02P 25/062* | (2016.01) |

(52) U.S. Cl.
CPC ............ *H02M 7/48* (2013.01); *B66C 13/26* (2013.01); *H02M 5/40* (2013.01); *H02P 6/08* (2013.01); *H02P 23/08* (2013.01); *H02P 25/062* (2016.02); *H02P 27/047* (2013.01); *H02P 27/06* (2013.01); *B66C 2700/081* (2013.01)

(58) Field of Classification Search
None
See application file for complete search history.

(56) References Cited

U.S. PATENT DOCUMENTS

| 5,206,575 A * | 4/1993 | Nakamura ............ H02P 27/08 318/807 |
| 8,520,417 B2 * | 8/2013 | Erdman ................ H02P 9/105 363/37 |
| 2003/0160585 A1* | 8/2003 | Na ........................ H02P 21/22 318/432 |
| 2008/0303289 A1* | 12/2008 | Holliday ................ F02D 29/00 290/4 R |

(Continued)

FOREIGN PATENT DOCUMENTS

| JP | 2005027410 A | 1/2005 |
| JP | 2007295648 A | 11/2007 |
| KR | 101210022 B1 | 12/2012 |

OTHER PUBLICATIONS

Korean Office Action for related Korean Application No. 10-2018-0012683; action dated Jan. 31, 2019; (4 pages).

*Primary Examiner* — Jeffrey A Gblende
(74) *Attorney, Agent, or Firm* — K&L Gates LLP

(57) ABSTRACT

The present disclosure relates to an inverter provided in a hoist system, which includes a scale unit configured to control a size of a DC link voltage of the inverter, a proportional-integral (PI) controller configured to perform PI-control on an output of the scale unit and an output voltage of the inverter and outputting a control signal, a first calculating unit configured to sum a command frequency of the inverter and the control signal, and a voltage determining unit configured to determine an output voltage of the inverter from an output frequency of the first calculating unit.

10 Claims, 5 Drawing Sheets

(56) References Cited

U.S. PATENT DOCUMENTS

| | | | |
|---|---|---|---|
| 2013/0057242 A1* | 3/2013 | Zambetti | H02M 3/1584 |
| | | | 323/282 |
| 2015/0102759 A1* | 4/2015 | Shimomugi | H02M 1/4225 |
| | | | 318/504 |
| 2017/0170743 A1* | 6/2017 | Medagam | H02M 5/458 |
| 2018/0164380 A1* | 6/2018 | Lee | G01R 31/343 |

* cited by examiner

INVERTER SUPPLYING POWER TO INDUCTION MOTOR FOR DRIVING HOIST

CROSS-REFERENCE TO RELATED APPLICATIONS

Pursuant to 35 U.S.C. § 119(a), this application claims the benefit of earlier filing date and right of priority to Korean Application No. 10-2018-0012683, filed on Feb. 1, 2018, entitled "INVERTER", which is hereby incorporated by reference in its entirety into this application.

BACKGROUND

1. Technical Field

The present disclosure relates to an inverter.

2. Description of the Related Art

In general, a hoist signifies a mechanical apparatus having a function of lifting a heavy object by using a motor. An induction motor capable of directly inputting system power is often used for a hoist.

When an induction motor mounted on a hoist apparatus is directly driven by using commercial power, a large inrush current is caused and the life of the induction motor is shortened. Also, since the induction motor is controlled at a single speed only, the inverter is generally used for driving the induction motor.

An inverter is a sort of device that receive power supplied from a commercial power source and supplying the power to a motor by varying a voltage and a frequency thereof, thereby controlling a speed of a motor at high efficiency.

When the inverter is used for a hoist apparatus, the induction motor may be driven at a desired speed by using a variable voltage variable frequency (VVVF) function of an inverter, and thus an inrush current may be prevented.

When the inverter is mounted on the hoist apparatus to drive the induction motor at multi-level speed, the induction motor may be driven at a motor speed divided into a low speed and a high speed, or at a motor speed controlled by a user by using a two-step or three-step operation method.

Since a counter-electromotive force increases as the speed of the induction motor increases, a higher driving voltage is needed. However, when the hoist apparatus is driven at high speed, an input voltage of the inverter is lowered due to a system malfunction, a voltage output from the inverter decreases as well. Accordingly, the induction motor may not be driven at a desired speed.

Furthermore, when the input voltage of the inverter is lowered as a hoist holds an object, a trip of the inverter is generated and thus an accident may occur as the object being held falls.

SUMMARY

It is an object of the present disclosure to provide an inverter which may lift an object at a slightly lower speed than a desired speed, rather than falling an object or stopping an operation, even when an input voltage of the inverter in a hoist apparatus decreases, thereby improving user convenience and preventing accidents.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an inverter provided in a hoist system includes a scale unit configured to control a size of a DC link voltage of the inverter, a proportional-integral (PI) controller configured to perform PI-control on an output of the scale unit and an output voltage of the inverter and outputting a control signal, a first calculating unit configured to sum a command frequency of the inverter and the control signal, and a voltage determining unit configured to determine an output voltage of the inverter from an output frequency of the first calculating unit.

The scale unit may include a first multiplier configured to multiply the DC link voltage by $$\frac{1}{\sqrt{3}}$$

and output a resultant of the multiplication.

The scale unit may further include a second multiplier configured to multiply an output of the first multiplier by a gain K that is less than 1 and output a resultant of the multiplication.

The inverter may further include a first convertor configured to convert a Q-axis voltage of a synchronous reference frame that is an output of the voltage determining unit, to a Q-axis voltage of a stationary reference frame, and a second convertor configured to convert a Q-axis voltage of a stationary reference frame to a three-phase voltage.

The inverter may further include a torque booster configured to determine a compensation voltage to compensate for a torque according to a size of an output current of the inverter, and a slip compensator configured to determine a compensation frequency to compensate a slip according to the size of the output current of the inverter the inverter.

The inverter may further include a third convertor configured to convert the three-phase output current of the inverter to a Q-axis current of a stationary reference frame, and a fourth convertor configured to convert the Q-axis output current of the stationary reference frame to a Q-axis current of a synchronous reference frame.

The inverter may further include a second calculating unit configured to sum the compensation voltage output from the torque booster and an output of the voltage determining unit.

The inverter may further include a third calculating unit configured to sum the compensation frequency output from the slip compensator and a commend frequency of the inverter.

DETAILED DESCRIPTION

Figure 1:
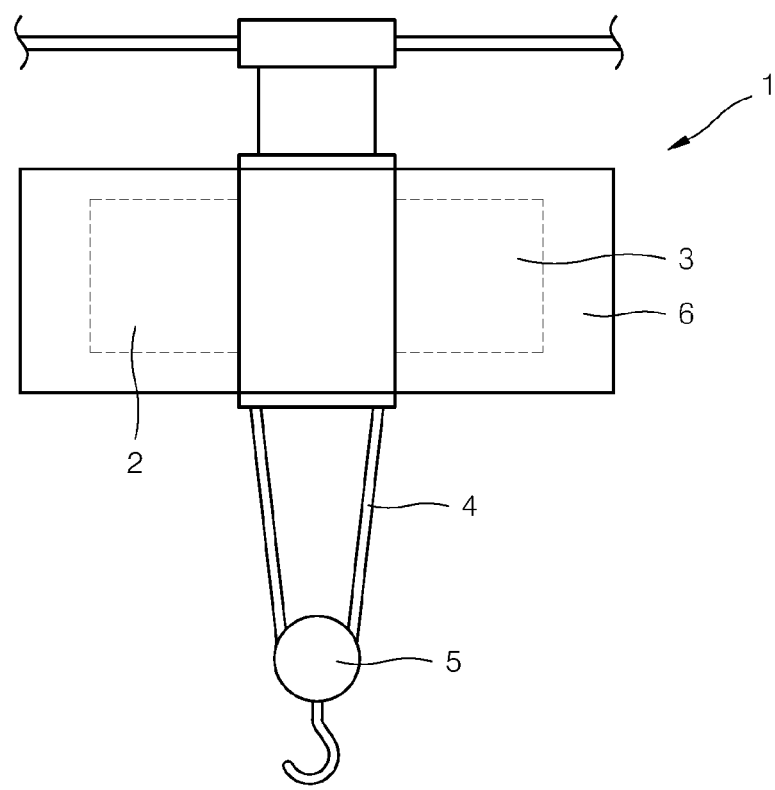
FIG. 1 is a schematic view of a hoist system adopting an inverter according to an embodiment of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

While such terms as "first," "second," etc., may be used to describe various components, such components must not be limited to the above terms. The above terms are used only to distinguish one component from another. For example, without deviating from the right scope of the present disclosure, a "first constituent element" may be referred to as a "'second constituent element", and similarly the "second constituent element" may be referred to as the "first constituent element". Furthermore, an expression used in a singular form in the present specification also includes the expression in its plural form unless clearly specified otherwise in context. Unless defined otherwise, all terms used herein including technical or scientific terms have the same meanings as those generally understood by those of ordinary skill in the art to which the present disclosure may pertain.

In the following description, an inverter according to an embodiment of the present disclosure is described with reference to FIGS. 1 to 5.

FIG. 1 is a schematic view of a hoist system 1 adopting an inverter 3 according to an embodiment of the present disclosure.

As illustrated in the drawing, in the hoist system 1, a wire rope 4 is released or wound by an operation of an induction motor 2 for hoisting in a control box 6, and thus a hook 5 is moved up or down. Accordingly, an object held by the hook 5 is raised or lowered.

When the induction motor 2 mounted in the hoist system 1 is directly driven by commercial power, a large inrush current is generated when the commercial power is applied thereto, and thus life of a motor 2 may be shortened and the induction motor 2 may not be controlled at a single speed. Accordingly, the hoist system 1 is provided with the inverter 3, and thus the supply of power is performed by the inverter 3. When power is supplied to the motor 2 by the inverter 3, by a variable voltage variable frequency (VVVF) control method of the inverter 3, the motor 2 may be driven at a desired speed and an inrush current may be prevented.

When, in the hoist system 1, the motor 2 is driven by the inverter 3 at multi-level speed, the induction motor may be driven at a motor speed divided into a low speed and a high speed, or at a motor speed controlled by a user by using a two-step or three-step operation method, which may be set by the user. To this end, the hoist system 1 may be further provided with a human-machine interface (HMI) connected to the inverter 3 through a network.

In general, since a counter-electromotive force increases as a speed increases, the motor 2 needs a greater driving voltage. When a motor is driven at high speed and an input voltage of the inverter 3 decreases due to a system malfunction, a voltage to be output from the inverter 3 decreases as well, and thus the motor 2 may not be operated at a desired speed. Furthermore, since the same frequency is applied to the motor 2 even when the input voltage of the inverter 3 is lowered, overload is generated in the motor 2, and thus an object held by the hook 5 may fall or lifting up/down may be stopped.

Accordingly, the present disclosure provides a method of lifting an object up/down at a speed slightly lower than a desired speed without falling the object or stopping the lifting up/down even when the input voltage of the inverter 3 decreases. Accordingly, the present disclosure may enhance user convenience and system stability.

In an embodiment of the present disclosure, the motor 2 and the inverter 3 are briefly illustrated, the present disclosure is not limited to the arrangements and shapes of the motor 2 and the inverter 3, and may be variously configured according to the structure of the hoist system 1.

Figure 2:
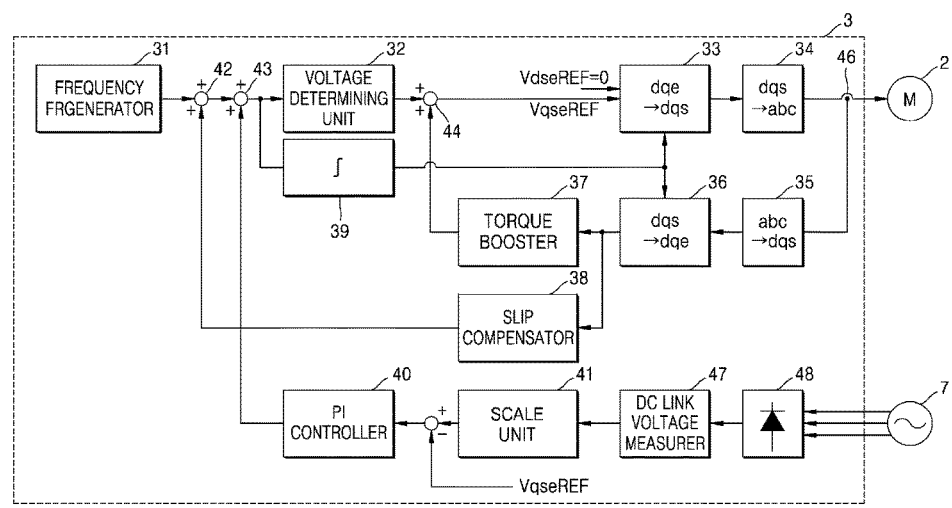
FIG. 2 is a block diagram of a detailed configuration of an inverter according to an embodiment of the present disclosure.

FIG. 2 is a block diagram of a detailed configuration of an inverter 3 according to an embodiment of the present disclosure.

As illustrated in the drawing, the inverter 3 according to the embodiment of the present disclosure may include a frequency generator 31, a voltage determining unit 32, first to fourth convertors 33 to 36, a torque booster 37, a slip compensator 38, a proportional-integral (PI) controller 40, a scale unit 41, first to fourth calculating units 42 to 45, and a sensor 46.

The frequency generator 31 may generate a command frequency that is a speed of the motor 2 set by a user. The voltage determining unit 32 may determine a voltage corresponding to an input frequency.

Figure 3:
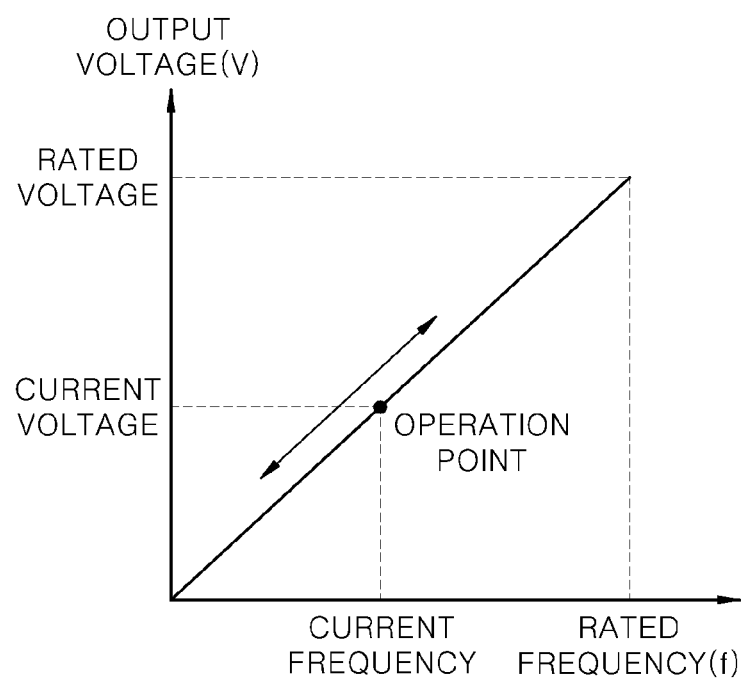
FIG. 3 is a graph for explaining that a voltage determining unit of FIG. 2 determines a voltage corresponding to an input frequency.

FIG. 3 is a graph for explaining that the voltage determining unit 32 of FIG. 2 determines a voltage corresponding to an input frequency.

As illustrated in the drawing, the voltage determining unit 32 according to the embodiment of the present disclosure may determine an output voltage corresponding to an input frequency by the VVVF control method.

In FIG. 2, the first convertor 33 may convert a Q-axis voltage VqseREF of a synchronous reference frame that is an output of the third calculating unit 44, to a Q-axis voltage of a stationary reference frame, and the second convertor 34 may convert a Q-axis voltage of a stationary reference frame to a three-phase voltage. The three-phase voltage output from the second convertor 34 may be input to the motor 2 as an output of the inverter 3.

The sensor 46, as a current transformer (CT) for example, may detect a current output from the inverter 3 to the motor 2.

The third convertor 35 may convert the three-phase current output from the inverter 3 to the motor 2 and detected by the sensor 46, to a Q-axis current of a stationary reference frame, and the fourth convertor 36 may convert the Q-axis current of a stationary reference frame to a Q-axis current of a synchronous reference frame.

When the first convertor 33 converts a Q-axis voltage of a synchronous reference frame to a stationary reference frame and fourth convertor 36 converts the Q-axis current of a stationary reference frame to a synchronous reference frame, the first convertor 33 and the fourth convertor 36 may perform coordinate system transformation by using a value (angle) obtained by integrating an input frequency that is an input of the voltage determining unit 32, by an integrator 39. An equation of transforming $f^s_d$ and $f^s_q$ that are physical quantities of a stationary reference frame to $f^e_d$ and $f^e_q$ that are physical quantities of synchronous reference frame is as follows.

$$f^e_d = f^r_d \cos\theta + f^r_q \sin\theta$$

$$f^e_q = -f^r_q \sin\theta + f^r_q \cos\theta \quad \text{[Equation 1]}$$

In this state, $\theta = \int \omega_e dt$ and $\omega_e$ may denote an input frequency applied to the voltage determining unit 32.

The torque booster 37 is provided to solve a problem occurring when a frequency is low and a low voltage is applied to magnetization inductance of the motor 2 due to a voltage drop by resistance of a stator of the motor 2, and thus a low current may flow in a rotor and a large torque may not be generated. The torque booster 37 may determine a compensation voltage according to the amount of a Q-axis current and provide a determined compensation voltage to the third calculating unit 44. The torque may be increased according to the compensation voltage.

A compensation voltage $V_{boost}$ determined by the torque booster 37 may be determined according to the following equation.

$$V_{boost} = V_{rated} \times \frac{F_{sl,rated}}{F_{rated}} \times \frac{I_{qs}}{I_{rated}} \quad \text{[Equation 2]}$$

In the equation, $V_{rated}$ denotes a rated voltage, $I_{rated}$ denotes a rated current, $F_{rated}$ denotes a rated frequency, $F_{sl,rated}$ denotes a rated slip frequency, $I_{qs}$ denotes a Q-axis current provided by the fourth convertor 36.

The slip compensator 38 may receive a Q-axis current from the fourth convertor 36 and determine a compensation frequency according to a size of a Q-axis current. In general, when a load is applied to the motor 2, the frequency of a rotor of the motor 2 rotor decreases, and a lowered frequency is referred to as a slip frequency. The size of a slip frequency is proportional to the size of a load, and the size of a load is approximately proportional to the amount of current. Accordingly, the slip compensator 38 may compensate for the frequency output from the frequency generator 31 by determining the compensation frequency as in Equation 3.

$$F_{comp} = F_{sl,rated} \times \frac{I_{qs}}{I_{rated}} \quad \text{[Equation 3]}$$

In the equation, $F_{comp}$ denotes a compensation frequency.

The scale unit 41 may receive a DC link voltage of the inverter 3 and convert the size of the DC link voltage to a maximum voltage that may be output from the inverter 3. The inverter 3 receives commercial power 7, and a rectifier 48 rectifies the commercial power 7 and stores a rectified voltage in a DC link capacitor (not shown). A DC link voltage measurer 47 according to an embodiment of the present disclosure may measure a DC link voltage stored in the DC link capacitor and provide the stored DC link voltage to the scale unit 41.

Figure 4:
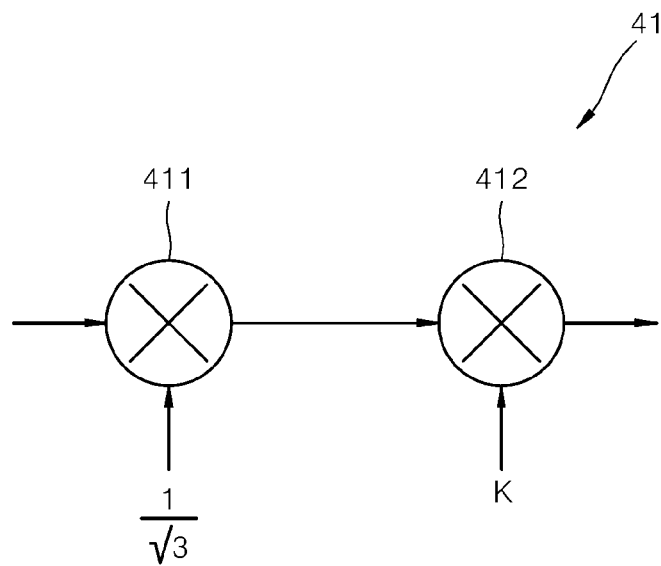
FIG. 4 is a detailed view of an example of a scale unit of FIG. 2.

FIG. 4 is a detailed view of an example of the scale unit 41 of FIG. 2.

As illustrated in the drawing, the scale unit 41 according to the present embodiment of the present disclosure may include a first multiplier 411 and a second multiplier 412.

$$\frac{V_{DC}}{\sqrt{3}}$$

A linear modulation maximum value of the inverter 3 is. Accordingly, The first multiplier 411 may output $$\frac{V_{DC}}{\sqrt{3}}$$

by multiplying an input DC link voltage by $$\frac{1}{\sqrt{3}}.$$

The second multiplier 412 may output by multiplying an output of the first multiplier 411 by a gain K for fine tuning. "K" may be a value set by a user considering margin due to voltage drop in an internal device of the inverter 3, and is a value less than 1.

The fourth calculating unit 45 may receive an output of the scale unit 41 and a Q-axis voltage command, and deduct the Q-axis voltage command from the output of the scale unit 41. Since in V/F control, a D-axis voltage command is 0, the Q-axis voltage command is the same as an output voltage of the inverter 3.

The PI controller 40 may receive an output of the fourth calculating unit 45 and output a control signal. In detail, the PI controller 40 may integrate the DC link voltage output from the fourth calculating unit 45 and an error signal of the Q-axis voltage command (that is, the output of the fourth calculating unit 45), and output a proportional-integral control value regarding the error.

The operation of the inverter 3 according to an embodiment of the present disclosure is described below.

The fourth calculating unit 45 may output a value obtained by deducting the Q-axis voltage command (inverter output voltage) from a value of scaling the DC link voltage measured by the DC link voltage measurer 47 (output of the scale unit 41), and provide the value to the PI controller 40.

In this state, when the input voltage of the inverter 3 decreases due to an abnormal operation of the commercial power 7, the DC link voltage measured by the DC link voltage measurer 47 decreases. Accordingly, when the output of the scale unit 41 is less than the Q-axis voltage command that is the inverter output voltage, the output control signal of the PI controller 40 may be negative.

When a sum of the command frequency that is the output of the frequency generator 31 and a compensation slip frequency that is the output of the slip compensator 38 is determined by the first calculating unit 42, and the output control signal of the PI controller 40 and the output of the first calculating unit 42 are summed by the second calculating unit 43 and an output frequency is determined, the voltage determining unit 32 may determine an output voltage corresponding to an output frequency of the second calculating unit 43011. The output voltage determined as above may be converted to a three-phase voltage by the first and second convertors 33 and 34 and applied to the motor 2.

In other words, the output frequency applied to the voltage determining unit 32 is decreased by a negative control signal of the PI controller 40. Accordingly, as the output voltage decreases, the voltage applied to the motor 2 may be decreased by the V/f pattern as shown in FIG. 3 as well.

Accordingly, according to the present embodiment of the present disclosure, the output voltage of the inverter 3 may be controlled within $$\frac{V_{DC}}{\sqrt{3}}.$$

Figure 5:
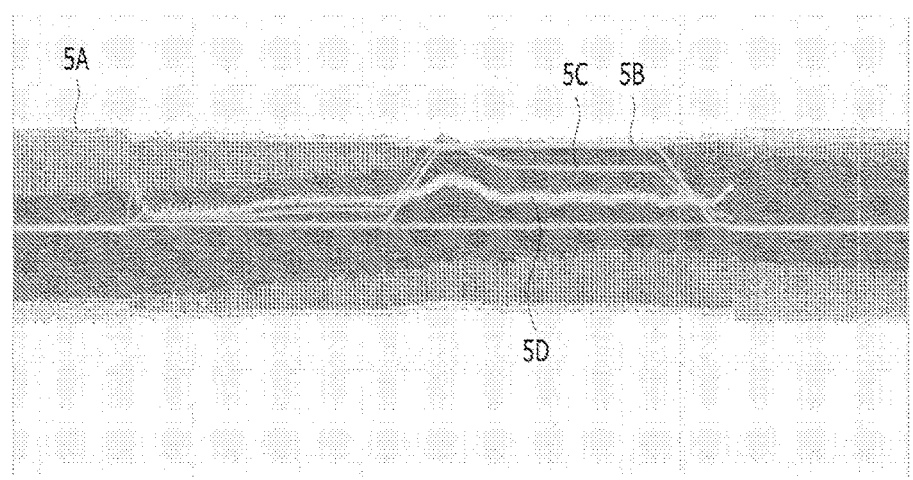
FIG. 5 is a graph for explaining an operation of an inverter according to an embodiment of the present disclosure.

FIG. 5 is a graph for explaining an operation of an inverter according to an embodiment of the present disclosure. A channel 1 5A indicates an input voltage of an inverter. A channel 2 5B indicates an output of the frequency generator 31. A channel 3 5C indicates an output of the second calculating unit 43. A channel 4 5D indicates an output Q-axis current of the inverter 3.

It may be seen from the channel 1 that, even when the input voltage of the inverter 3 is decreased to a voltage of 187 V less than a rated voltage of 220V (5A), the output of the frequency generator 31 is maintained constant (5B).

The output frequency of the second calculating unit 43 is decreased by the output control signal of the PI controller 40 of the present disclosure (5C). Accordingly, it may be seen that the output frequency is less than the command frequency generated by the frequency generator 31.

It may be seen from the Q-axis current command of the channel 4 that, when the input voltage of the inverter 3 decreases, the Q-axis current of the inverter 3 is increased due to overload of the motor 2. According to an embodiment of the present disclosure, the Q-axis current is maintained at a certain level.

In other words, according to the inverter 3 of the present disclosure, the output frequency is reduced without an increase in the Q-axis current due to lack of voltage at high speed, and thus the output frequency is controlled to fit to the input voltage of the inverter 3, thereby enabling a smooth operation.

As such, according to an embodiment of the present disclosure, even when the input voltage of the inverter 3 is abnormally lowered, the output frequency is automatically controlled so that the hoist system 1 can lift an object. Thus, system stability may be secured and user convenience may be provided.

The present disclosure described above may be variously substituted, altered, and modified by those skilled in the art to which the present inventive concept pertains without departing from the scope and sprit of the present disclosure. Therefore, the present disclosure is not limited to the above-mentioned exemplary embodiments and the accompanying drawings.

What is claimed is:

1. An inverter comprising:
   a scale unit configured to control a size of a DC link voltage of the inverter;
   a proportional-integral (PI) controller configured to perform PI-control on an output of the scale unit and an output voltage of the inverter and outputting a control signal;
   a first calculating unit configured to sum a command frequency of the inverter and the control signal; and
   a voltage determining unit configured to determine an output voltage of the inverter from an output frequency of the first calculating unit,
   wherein the scale unit converts the size of the DC link voltage to a maximum voltage that can be output from the inverter, and multiplies the converted size of the DC link voltage by a gain K that is less than 1.

2. The inverter of claim 1, wherein the scale unit comprises a first multiplier configured to multiply the DC link voltage by $$\frac{1}{\sqrt{3}}$$

and output a resultant of the multiplication.

3. The inverter of claim 2, wherein the scale unit further comprises a second multiplier configured to multiply an output of the first multiplier by the gain K and output a resultant of the multiplication.

4. The inverter of claim 1, further comprising:
   a first convertor configured to convert a Q-axis voltage of a synchronous reference frame that is an output of the voltage determining unit, to a Q-axis voltage of a stationary reference frame; and
   a second convertor configured to convert a Q-axis voltage of a stationary reference frame to a three-phase voltage.

5. The inverter of claim 1, further comprising:
   a torque booster configured to determine a compensation voltage to compensate for a torque according to a size of an output current of the inverter; and
   a slip compensator configured to determine a compensation frequency to compensate a slip according to the size of the output current of the inverter.

6. The inverter of claim 5, wherein the compensation voltage and the compensation frequency are proportional to the size of the output current.

7. The inverter of claim 5, further comprising:
   a third convertor configured to convert the three-phase output current of the inverter to a Q-axis current of a stationary reference frame; and
   a fourth convertor configured to convert the Q-axis output current of the stationary reference frame to a Q-axis current of a synchronous reference frame.

8. The inverter of claim 5, further comprising a second calculating unit configured to sum the compensation voltage output from the torque booster and an output of the voltage determining unit.

9. The inverter of claim 5, further comprising a third calculating unit configured to sum the compensation frequency output from the slip compensator and a commend frequency of the inverter.

10. The inverter of claim 1, further comprising:
    a rectifier configured to receive and rectify a commercial power; and
    a voltage measurer configured to measure the DC link voltage rectified by the rectifier and stored in a DC link capacitor.

* * * * *